No. 690,586.  
W. L. JUDSON.  
VARIABLE SPEED POWER TRANSMISSION MECHANISM.  
(Application filed Mar. 5, 1901.)  
Patented Jan. 7, 1902.
(No Model.) 7 Sheets—Sheet 2.
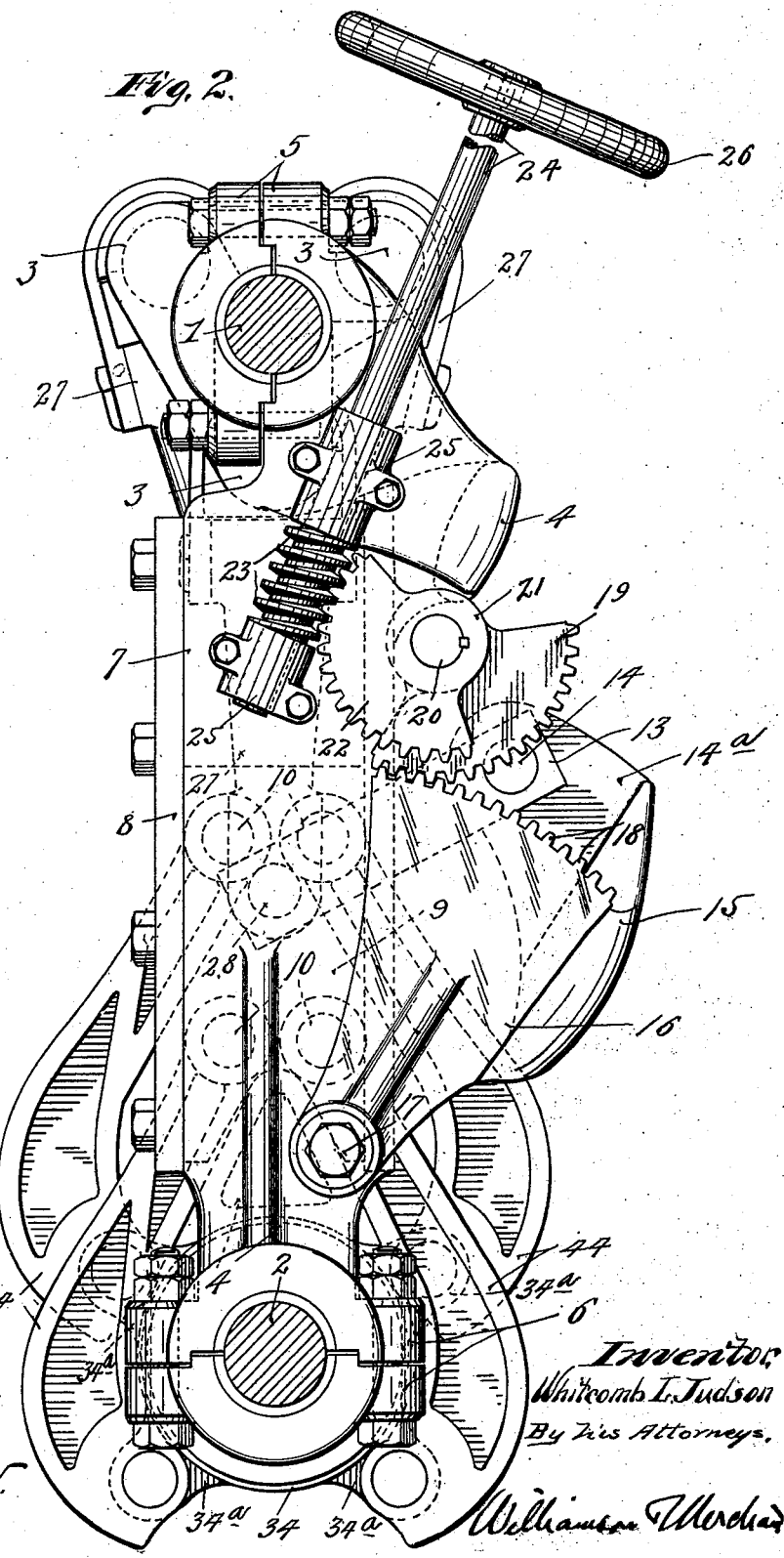

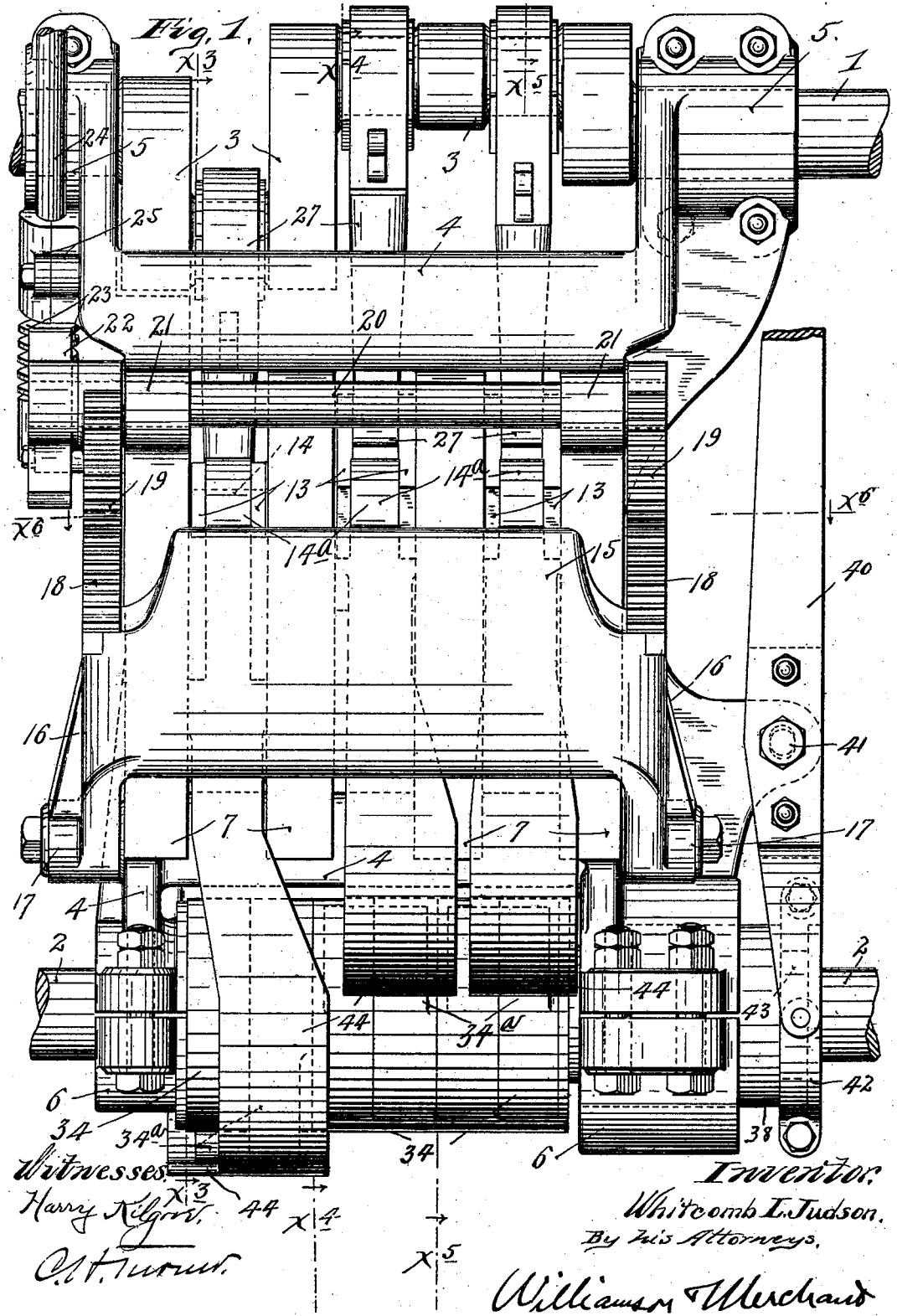

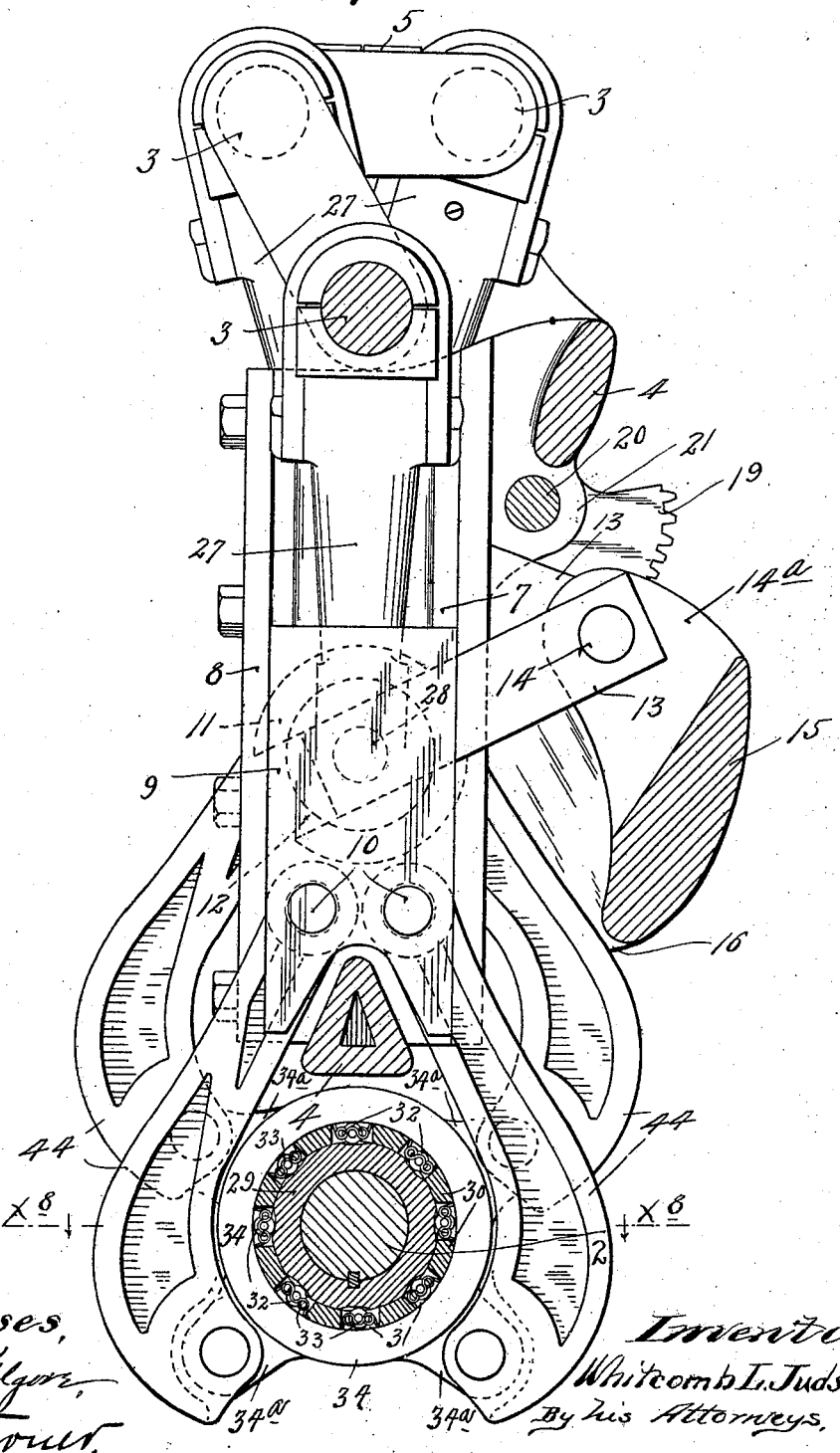

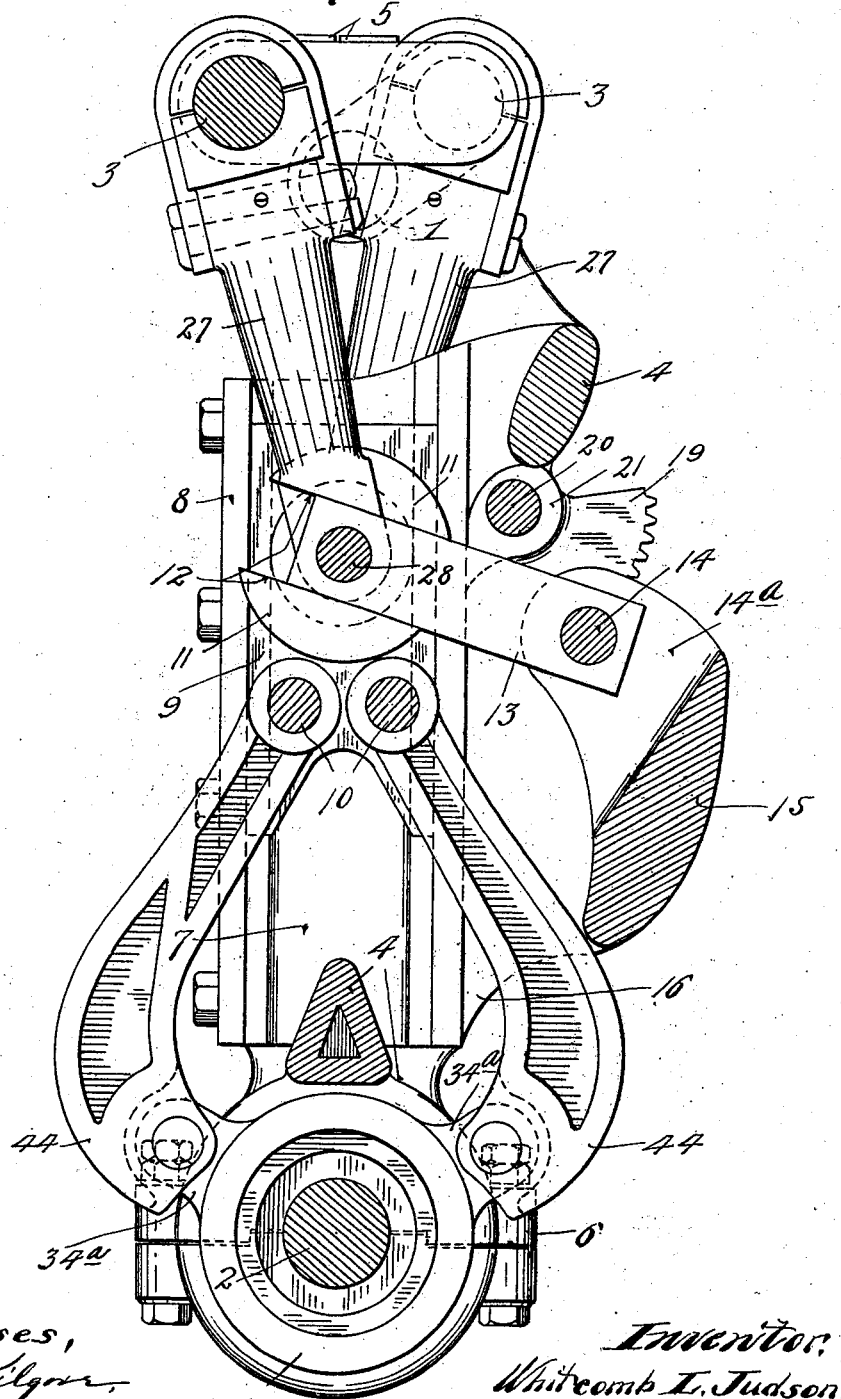

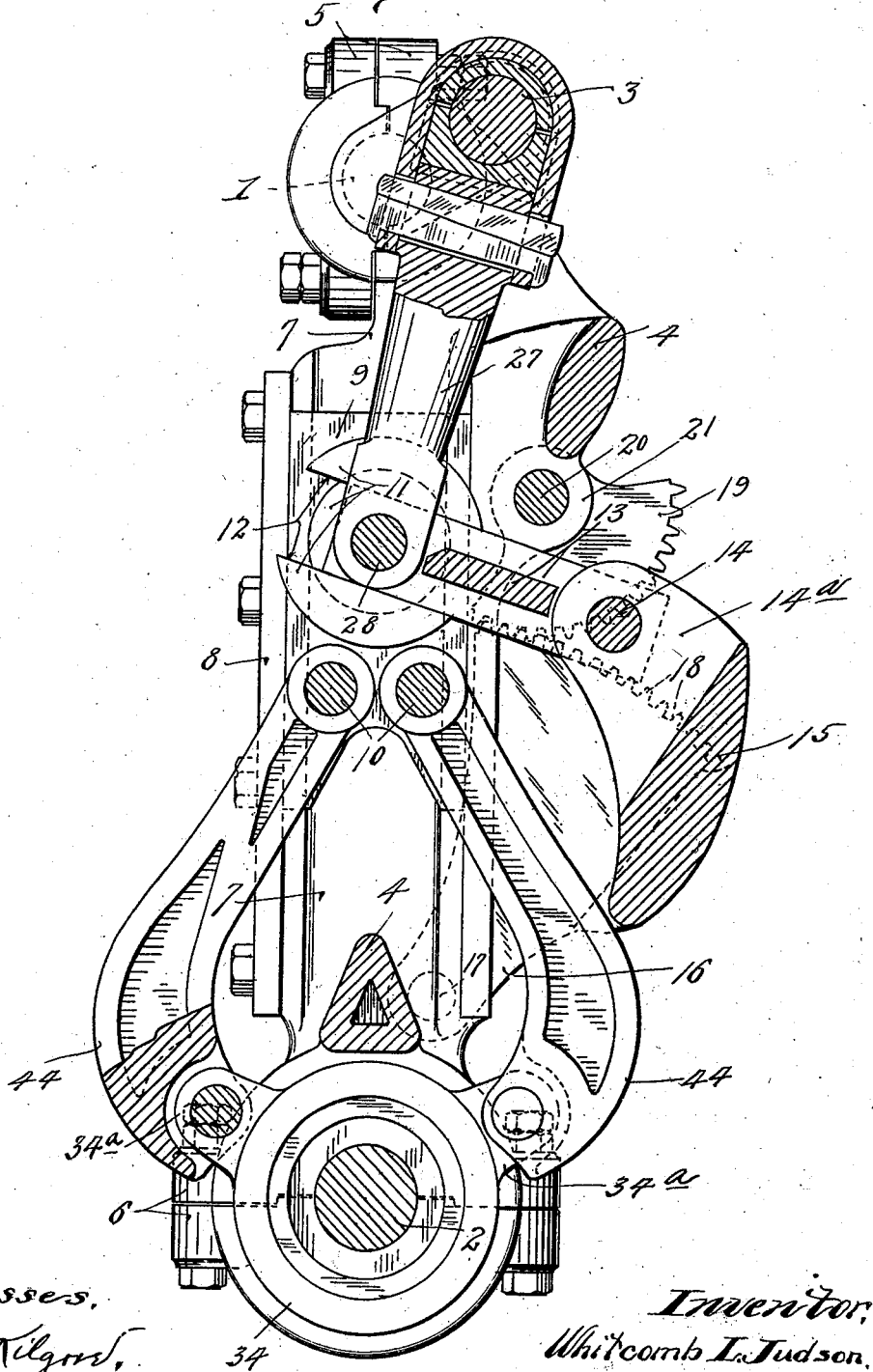

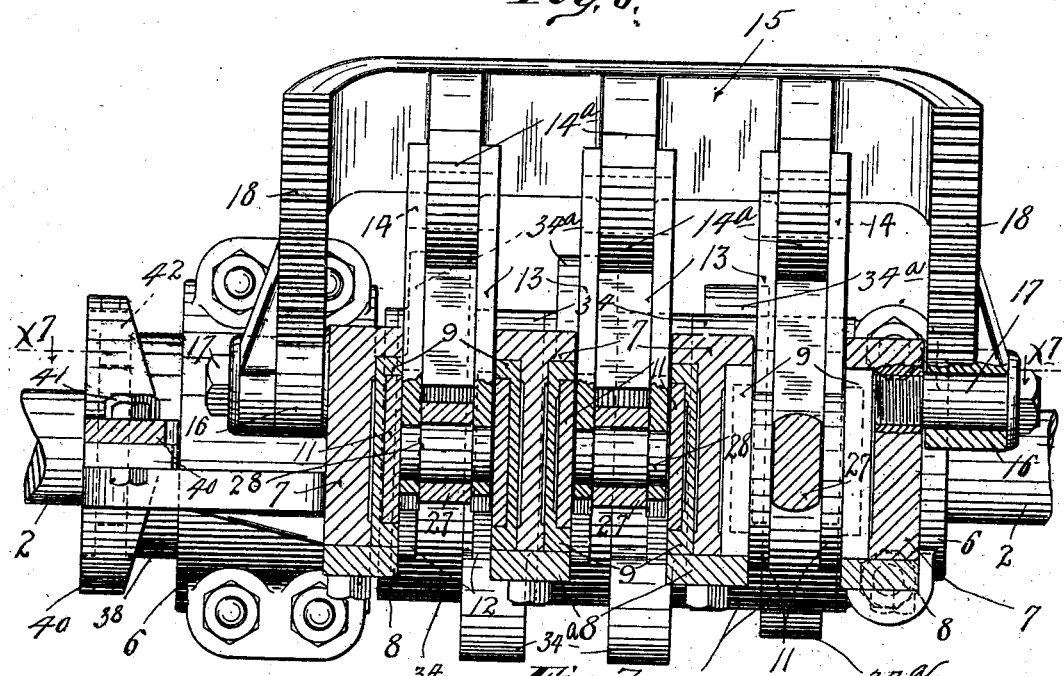

No. 690,586. Patented Jan. 7, 1902.
W. L. JUDSON.
VARIABLE SPEED POWER TRANSMISSION MECHANISM.
(Application filed Mar. 5, 1901.)
(No Model.) 7 Sheets—Sheet 7.
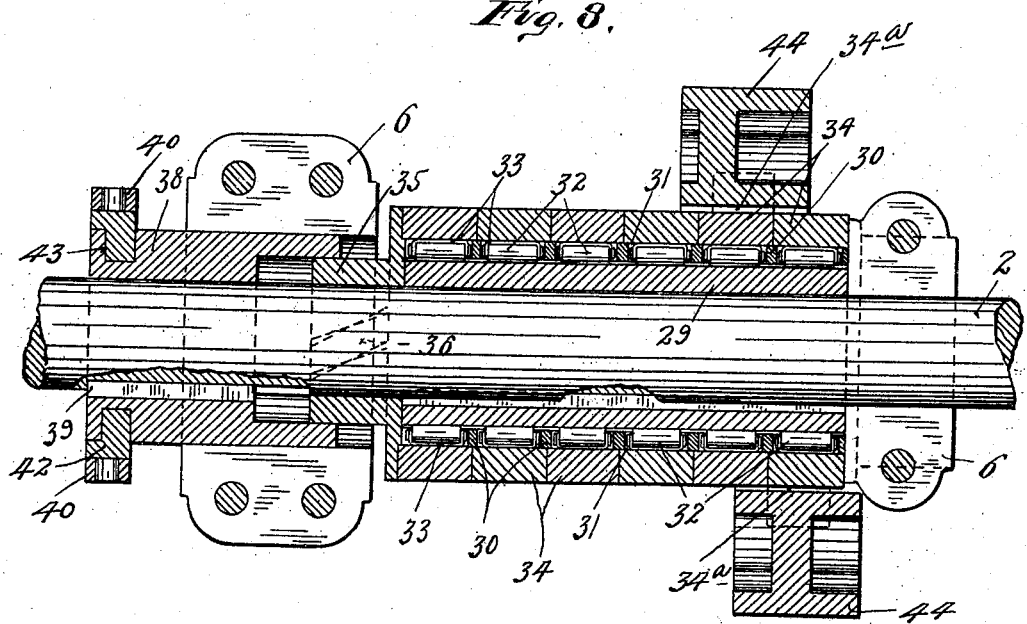
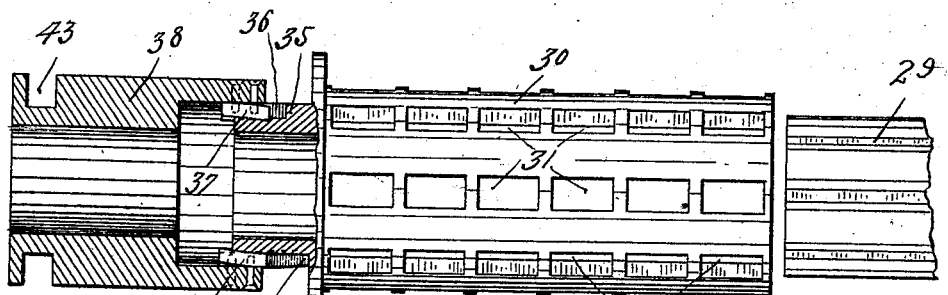
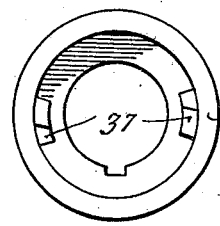 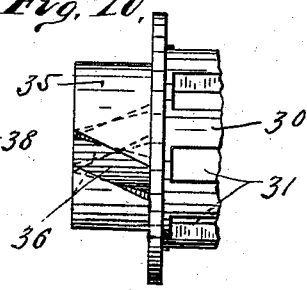 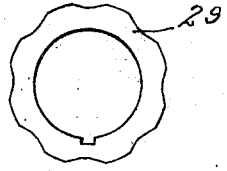

UNITED STATES PATENT OFFICE.

WHITCOMB L. JUDSON, OF CHICAGO, ILLINOIS.

VARIABLE-SPEED POWER-TRANSMISSION MECHANISM.

SPECIFICATION forming part of Letters Patent No. 690,586, dated January 7, 1902.

Application filed March 5, 1901. Serial No. 49,700. (No model.)

*To all whom it may concern:*

Be it known that I, WHITCOMB L. JUDSON, a citizen of the United States, residing at Chicago, in the county of Cook and State of Illinois, have invented certain new and useful Improvements in Variable-Speed Power-Transmission Mechanism; and I do hereby declare the following to be a full, clear, and exact description of the invention, such as will enable others skilled in the art to which it appertains to make and use the same.

My present invention relates to variable-speed power-transmission mechanism, and has for its object to improve the same in point of simplicity and efficiency and to especially meet the requirements of heavy transportation service, such as in heavy railway motor-cars.

To the above ends the invention consists of the novel devices and combinations of devices hereinafter described, and defined in the claims.

In the accompanying drawings my improved power-transmission mechanism is shown as designed for very heavy work, and the general features of construction therein embodied may be briefly outlined as follows: A constantly-running driving-shaft which receives its motion from a suitable motor is provided with three cranks set one hundred and twenty degrees in advance of each other. For each crank there is a reciprocating cross-head. The cross-heads are of course mounted in suitable guides, and in the illustration given they work vertically. The cross-heads are bifurcated, and in the sides of the same are pivotally mounted laterally-spaced pairs of wrist-blocks. Oscillating levers are mounted to slide endwise through diametrically-cut seats in the faces of the coöperating wrist-block, and these levers are pivotally fulcrumed to a common adjustable fulcrum-block. The free or vibrating ends of the three oscillating levers are connected by suitable pitmen, one to each of the three driving-cranks. By adjustments of the fulcrum-block the vibrating or free ends of the several oscillating levers may be projected more or less through the wrist-blocks, so that under the constant or unvarying strokes of the cranks and pitmen a variable throw may be imparted to the cross-heads. By adjusting the pivotal connections between the oscillating levers and the fulcrum-block into concentricity with the axes of the wrist-blocks the cross-heads are caused to stand still, while the driving-cranks, pitmen, and oscillating levers are given full movements. For action on the driven shaft a plurality of clutches are provided, and these clutches are in the preferred arrangement connected to the cross-heads in reversely-acting pairs by means of suitable links. Under the variable reciprocations of the cross-heads the clutches are given variable throws, so that a variable motion may be imparted from the driving-shaft to the driven shaft.

In the accompanying drawings, like characters indicate like parts throughout the several views.

Figure 1 is a front elevation of the improved power-transmission mechanism. Fig. 2 is a side elevation of the same. Fig. 3 is a vertical section on the line $x^3 \, x^3$ of Fig. 1. Fig. 4 is a vertical section on the line $x^4 \, x^4$ of Fig. 1, some parts being removed. Fig. 5 is a vertical section on the line $x^5 \, x^5$ of Fig. 1. Fig. 6 is a horizontal section approximately on the line $x^6 \, x^6$ of Fig. 1. Fig. 7 is a vertical section through the cross-head guides approximately on the line $x^7 \, x^7$ of Fig. 6, some parts being removed and others being broken away. Fig. 8 is a horizontal section approximately on the line $x^8 \, x^8$ of Fig. 3, illustrating the clutch mechanism. Fig. 9 is a view, partly in plan, partly in horizontal section, and with some parts broken away, showing parts of the clutch mechanism drawn apart. Fig. 10 is a plan view of one end of the so-called "clutch-reversing" cage. Fig. 11 is an end elevation of the parts shown in Fig. 10, and Fig. 12 is an end elevation of the so-called "clutch-sleeve."

Assuming the device to be applied to a motor-car, the numeral 1 indicates the constantly-running driving-shaft, which is suitably mounted in bearings (not shown) carried by the truck-frame, and the numeral 2 indicates the variably-driven shaft, which in this illustration would be one of the axles of the truck. The driving-shaft 1 is provided with the three cranks indicated by the numeral 3 and set, as already indicated, one hundred and twenty degrees in advance of each other. A heavy vertically-disposed skeleton framework 4 is provided with upper journal-boxes 5, in which the driving-shaft 1 rotates, and with lower journal-boxes 6, in which the driven shaft or axle 2 rotates. The cranks 3 work between the upper boxes 5 and hold the frame 4 against lateral movements. The intermediate vertical portion of the frame 4 is divided to form suitable cross-head guides 7, which, as shown, are provided with removable side plates 8, which plates when removed permit the cross-heads to be placed in working position or to be removed. (For this construction see particularly Figs. 6 and 7.) The cross-heads, which of course work in the cross-head guides 7, are, as shown, made up of laterally-spaced plates 9, connected by pairs of heavy studs 10, which studs, it will be hereinafter noted, serve also as wrist-pins. In each plate 9 of the cross-heads is rotatively mounted the disk-like hub of a wrist-block 11, which wrist-blocks are provided with diametrically-extended face-grooves 12. The wrist-blocks 11 are arranged to work in pairs, and mounted to slide through the coöperating grooves 12 of each pair thereof is an oscillating lever 13. There are of course three of these levers 13, and each is, as shown, made up of laterally-spaced but rigidly-connected straps that quite closely fit between the plates 9 of the coöperating cross-heads. The levers 13 are pivotally connected at 14 to lugs 14$^a$ of an adjustable fulcrum-block 15, which fulcrum-block is provided at its ends with arm extensions 16, that are pivoted at 17 to the sides of the frame 4. The pivot 17 is so located that by movement of the fulcrum-block 15 the axis of the pivot 14 may be moved into concentricity with the axis of the wrist-blocks 11. To provide for this adjustment of the fulcrum-block 15, it is provided at its sides with segmental racks 18, which mesh with smaller segmental racks 19, secured on a common rock-shaft 20, mounted in suitable bearings 21 on the frame 4. At one end the rock-shaft 20 is provided with a segmental worm-gear 22, with which coöperates a worm or screw 23, carried by a shaft 24, which shaft is mounted in suitable bearing 25 on the frame 4 and is provided with a hand-wheel 26, by means of which it may be turned. As is evident by the proper manipulations of the hand-wheel 26 and worm 23 actuated thereby the several segmental gears may be oscillated in the desired direction, and the fulcrum-block 15 may be set and securely held in any desired adjustment. In the drawings the fulcrum-block is set to give the maximum throw to the cross-heads; but, as already indicated, by adjusting the same so that the pivots 14 are concentric with the axes of the wrist-blocks 11 the movements of the cross-heads will be reduced to zero.

The three cranks 3 are connected with their corresponding and coöperating levers 13 by means of suitable pitmen 27, the lower ends of which are pivoted at 28 between the bifurcated free ends of said levers 13, so that the said pivots 28 are adapted to be moved concentric with the axes of the coöperating wrist-blocks 11.

The clutch mechanism, which is in reality a plurality of clutches, is substantially identical with that set forth and claimed in my pending application, Serial No. 33,044, filed October 15, 1900, entitled "Reversible clutches." Hence as this clutch in itself forms no part of my present invention it may be here briefly described.

Between the bearings 6 of the frame 4 the driven shaft or axle 2 is provided with a longitudinally grooved or fluted clutch-sleeve 29, which is shown as rigidly keyed thereto. On this clutch-sleeve 29 is a sleeve-like clutch-reversing cage 30, provided with a plurality of rectangular perforations or roller-seats 31, in which the driving-rollers 32 are loosely mounted, the rollers, as shown, being yieldingly held central by light springs 33. (See Figs. 3, 8, and 9.) In the arrangement shown there are six circumferentially-extended series of rollers 32 and seats 31, and around each series of rollers is loosely mounted on the reversing-cage 30 an oscillating driving-ring 34, of which rings there are of course six. The rollers 32 work as wedges between the inner surfaces of the driving-rings 34 and the concave surfaces of the grooves in the face of the clutch-sleeve 29. At one end the so-called "reversing-cage" 30 is provided with a hub 35, formed with spiral cam-grooves 36, in which the internal keys 37 of a sliding clutch-reversing hub 38 work with a camming action. The reversing-hub 38 is directly mounted in one of the bearings 6 of the frame 4, and it is keyed at 39 to the driven shaft 2 for rotation therewith, but for sliding movement thereon. By means of a reversing-lever 40, which is shown as pivoted to the frame 4 at 41, and by means of a shipper-collar 42, pivotally connected between prongs of the said lever 40 and working in a groove 43 of said hub 38, the said hub may be given longitudinal sliding movement on the shaft 2, and the so-called "reversing-sleeve" 30 may be thrown to an extreme position in either direction to reverse the action of the clutch or may be moved to an intermediate position to throw all of the clutches simultaneously out of action.

The clutch driving-rings 34 are provided with projecting ears 34$^a$. The ears 34$^a$ of the members, which constitute a reversely-acting pair, project in opposite directions and are connected by links 44 to the wrist-pins 10 of the same cross-head. With this construction it follows that the one member of a particular pair of driving-rings 34 will be making its operative stroke while the other is making its idle or return stroke. Since the driving-cranks are set one in advance of the other, the cross-heads will be moved one in advance of the other, with the result that there is a constant application of power transmitted to the driven shaft or axle, under which action at a given instant the particular clutch driving-ring 34 which is moving in the right direction and at the highest speed is the one which is doing the work. The work is thus taken up in rapid succession by the several driving-rings.

This power-transmission mechanism, while especially adapted for heavy work, is nevertheless well adapted for light work, such as that required in ordinary automobiles, and it will of course be understood that the mechanism above described is capable of a great many modifications within the scope of my invention.

The term "crank" is of course used in a broad sense and would, as is obvious, include all forms of crank or eccentric devices.

The so-called "cross-heads" instead of being mounted in reciprocating guides might be mounted in oscillating guides. The clutch device may also take various forms. The invention is not limited to the illustrated construction of the cross-heads, wrist-blocks, and oscillating levers, although such construction is very important, as it permits of the ready adjustment of the parts to and from neutral or inoperative positions and has other advantages, such as strength, simplicity, and compactness.

What I claim, and desire to secure by Letters Patent of the United States, is as follows:

1. The combination with a driving-crank and a driven member, of a pitman driven by said crank, a cross-head with connections for action on said driven member, an adjustable fulcrum-block, and an oscillating lever pivoted at or near its extremities to said fulcrum-block and to said pitman, which lever has an endwise adjustment with respect to said cross-head and acts thereon with a varying leverage, under adjustments of said fulcrum-block.

2. The combination with a driving-crank, of a clutch, a cross-head with connections for actuating said clutch, an adjustable fulcrum-block, an oscillating lever pivoted to said fulcrum-block and adjustable endwise with respect to said cross-head and operating thereon with a varying leverage under adjustments of said fulcrum-block, a pitman driven by said crank and pivoted to the vibrating end of said lever, and a driven shaft subject to said clutch.

3. The combination with a driving-shaft having a plurality of cranks, of a corresponding plurality of cross-heads, clutches connected to said cross-heads in reversely-acting pairs, an adjustable fulcrum-block, oscillating levers pivoted to said fulcrum-block and adjustable endwise with respect to said cross-head and operating thereon, with correspondingly-varying leverages, under adjustments of said fulcrum-block, pitmen driven by said cranks and pivoted to the vibrating ends of said levers, and a driven shaft subject to said clutches.

4. The combination with a driving-shaft, of a clutch, a cross-head, connections for actuating said clutch, a wrist-block pivoted in said cross-head, an adjustable fulcrum-block, an oscillating lever pivoted to said fulcrum-block and adjustable endwise through said wrist-block, a pitman connecting said driving-crank to the free end of said oscillating lever, and a driven shaft subject to said clutch.

5. The combination with a driving-crank, of a clutch, a cross-head, connections for actuating said clutch, laterally-spaced wrist-blocks pivoted in said cross-head, an adjustable fulcrum-block, an oscillating lever pivoted to said fulcrum-block and adjustable diametrically through said wrist-blocks, its pivotal connection to said fulcrum-block being movable into concentricity with the axis of said wrist-block, a pitman connecting said driving-crank to the free end of said oscillating lever, and a driven shaft subject to said clutch.

6. The combination with a driving-shaft having a plurality of cranks, of a plurality of cross-heads, laterally-spaced wrist-blocks pivoted in said cross-heads, bifurcated oscillating levers mounted to slide endwise through diametrical seats in said wrist-blocks, a pivotally-adjustable fulcrum-block having lugs embraced by and pivoted to the fulcrumed ends of said oscillating levers, pitmen connecting said cranks to the vibrating ends of said levers, a driven shaft, clutches acting on said driven shaft, and links connecting said clutches to said cross-heads.

7. The combination with the driving-shaft having three cranks set one in advance of the other, of the three cross-heads with laterally-spaced sides, the laterally-spaced wrist-blocks mounted in said cross-heads and provided with diametrical face-grooves, the bifurcated levers adjustable in the face-grooves of said wrist-blocks, the pitmen connecting said cranks to the vibrating ends of said lever, the pivotally-adjustable fulcrum-block having lugs to which the fulcrumed ends of said levers are pivoted, segmental gears on the sides of said fulcrum-blocks, a rock-shaft with gears meshing with said segmental gears, a worm-gear on said rock-shaft, a hand-operated shaft having a worm coöperating with said worm-gear, a driven shaft, clutches acting on said driven shaft, and links connecting said clutches with said cross-heads.

In testimony whereof I affix my signature in presence of two witnesses.

WHITCOMB L. JUDSON.

Witnesses:
M. M. McGRORY,
F. D. MERCHANT.